(12) United States Patent
Wakimoto

(10) Patent No.: US 12,278,383 B2
(45) Date of Patent: Apr. 15, 2025

(54) BATTERY

(71) Applicant: SANYO Electric Co., Ltd., Osaka (JP)

(72) Inventor: Ryoichi Wakimoto, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 472 days.

(21) Appl. No.: 17/632,403

(22) PCT Filed: Jun. 23, 2020

(86) PCT No.: PCT/JP2020/024537
§ 371 (c)(1),
(2) Date: Feb. 2, 2022

(87) PCT Pub. No.: WO2021/024631
PCT Pub. Date: Feb. 11, 2021

(65) Prior Publication Data
US 2022/0285765 A1 Sep. 8, 2022

(30) Foreign Application Priority Data
Aug. 7, 2019 (JP) .................. 2019-145762

(51) Int. Cl.
*H01M 50/176* (2021.01)
*H01M 4/02* (2006.01)
(Continued)

(52) U.S. Cl.
CPC ........... *H01M 50/176* (2021.01); *H01M 4/70* (2013.01); *H01M 50/103* (2021.01);
(Continued)

(58) Field of Classification Search
CPC ............. H01M 50/531; H01M 50/533; H01M 50/534; H01M 50/536
See application file for complete search history.

(56) References Cited

U.S. PATENT DOCUMENTS

| 6,646,222 B1 * | 11/2003 | Burlingame ........... B23K 15/02 |
| | | 219/121.14 |
| 2003/0175587 A1 * | 9/2003 | Okutani .............. H01M 50/169 |
| | | 429/185 |

(Continued)

FOREIGN PATENT DOCUMENTS

| CN | 109119667 A | 1/2019 |
| CN | 109417153 A | 3/2019 |

(Continued)

OTHER PUBLICATIONS

Extended European Search Report dated Dec. 6, 2022 issued in the corresponding European Patent Application No. 20850241.9.

(Continued)

*Primary Examiner* — Matthew W Van Oudenaren
(74) *Attorney, Agent, or Firm* — Rimon P.C.

(57) ABSTRACT

A battery includes an electrode body obtained by stacking a positive electrode plate and a negative electrode plate with a separator interposed therebetween, an exterior body having an opening and housing the electrode body, a sealing plate sealing the opening, and an external terminal attached to the sealing plate. A tab is provided at at least one of the positive electrode plate or the negative electrode plate, and is electrically connected to the external terminal via a current collector between the electrode body and the sealing plate. The current collector includes a first current collector and a second current collector. The first current collector and the second current collector are welded to each other at a welding point covered with a covering member.

2 Claims, 11 Drawing Sheets

(51) Int. Cl.
H01M 4/70 (2006.01)
H01M 50/103 (2021.01)
H01M 50/184 (2021.01)
H01M 50/55 (2021.01)
H01M 50/555 (2021.01)

(52) U.S. Cl.
CPC ......... H01M 50/184 (2021.01); H01M 50/55 (2021.01); H01M 50/555 (2021.01); *H01M 2004/027* (2013.01); *H01M 2004/028* (2013.01)

(56) References Cited

U.S. PATENT DOCUMENTS

| | | |
|---|---|---|
| 2018/0375162 A1 | 12/2018 | Wakimoto et al. |
| 2019/0140251 A1 | 5/2019 | Wakimoto et al. |
| 2019/0267665 A1* | 8/2019 | Wakimoto ......... H01M 50/566 |
| 2020/0411835 A1 | 12/2020 | Wakimoto et al. |
| 2021/0280952 A1 | 9/2021 | Wakimoto et al. |

FOREIGN PATENT DOCUMENTS

| | | | |
|---|---|---|---|
| JP | 2009-087812 A | | 4/2009 |
| JP | 2016-091670 A | | 5/2016 |
| JP | 2017041320 | * | 2/2017 |
| JP | 2019-087477 A | | 6/2019 |
| WO | 2018/021372 A1 | | 2/2018 |
| WO | WO2018021371 | * | 2/2018 |

OTHER PUBLICATIONS

International Search Report issued in International Patent Application No. PCT/JP2020/024537, dated Aug. 18, 2020, with English translation.

Indian Office Action dated Jun. 22, 2022 issued in the corresponding Indian Patent Application No. 202247006846, with English translation.

* cited by examiner

BATTERY

CROSS-REFERENCE OF RELATED APPLICATIONS

This application is the U.S. National Phase under 35 U.S.C. § 371 of International Patent Application No. PCT/JP2020/024537, filed on Jun. 23, 2020, which in turn claims the benefit of Japanese Application No. 2019-145762, filed on Aug. 7, 2019, the entire disclosures of which Applications are incorporated by reference herein.

TECHNICAL FIELD

The present invention relates to a battery.

BACKGROUND ART

Batteries such as alkaline secondary batteries and non-aqueous electrolyte secondary batteries are used for purposes such as driving power sources for electric vehicles (EV), hybrid electric vehicles (HEV), and plug-in hybrid electric vehicles (PHEV), and stationary rechargeable battery systems for reducing output fluctuations in solar or wind power generation, for example, and for peak-shifting grid power to be stored at night and used in the daytime.

A foreign object may be mixed into such a battery while being assembled. In particular, a metal foreign object mixed into a battery may cause an internal short circuit. The internal short circuit has the following mechanism.

First, adhering to a positive electrode material, a metal foreign object is, as metal ions, dissolved into an electrolyte by a high potential of the positive electrode. After reaching a negative electrode, the metal ions precipitate as a metal. The metal precipitates to grow toward the positive electrode, break through a separator, and come into contact with the positive electrode, thereby causing an internal short circuit.

Secondary batteries are usually assembled in a cleanroom to reduce foreign objects such as metal foreign objects mixed into the batteries. In addition, the metal foreign objects attached to an electrode body during the assembly are removed by air blowing, suction, magnetic force adsorption, or wiping with a polishing tape, for example.

Patent Document 1 suggests a sealed battery obtained by inserting an electrode body into a bag-shaped porous body, and inserting, into a sealed container, the porous body with the electrode body inserted thereinto.

CITATION LIST

Patent Document

Patent Document 1: Japanese Unexamined Patent Publication No. 2009-87812

SUMMARY OF THE INVENTION

Patent Document 1 fails to specifically describe any method or advantage of interposing the porous body between the electrode body and the lid of the sealed container. The specific method is unknown. In addition, the used porous body is a bag, which consumes the active material and the battery capacity.

In view of the foregoing background, it is an objective of the present invention to provide a battery capable of effectively reducing foreign objects mixed into an electrode body, without reducing the battery capacity.

The battery of the present invention includes an electrode body obtained by stacking a positive electrode plate and a negative electrode plate with a separator interposed therebetween, an exterior body having an opening and housing the electrode body, a sealing plate sealing the opening, and an external terminal attached to the sealing plate. A tab is provided at at least one of the positive electrode plate or the negative electrode plate, and is electrically connected to the external terminal via a current collector between the electrode body and the sealing plate. The current collector includes a first current collector and a second current collector. The first current collector and the second current collector are welded to each other at a welding point covered with a covering member.

The first current collector has a recess. The first current collector and the second current collector are stacked and welded at the recess. The covering member covers the recess.

The recess includes a thinner part. The first current collector is welded to the second current collector by full penetration welding at the thinner part.

The covering member enters a dent formed by the recess.

A battery of the present invention include an electrode body obtained by stacking a positive electrode plate and a negative electrode plate with a separator interposed therebetween, an exterior body having an opening and housing the electrode body, a sealing plate sealing the opening, and positive and negative external terminals attached to the sealing plate. A positive electrode tab provided at the positive electrode plate is electrically connected to the positive electrode external terminal via a positive electrode current collector between the electrode body and the sealing plate. A negative electrode tab provided at the negative electrode plate is electrically connected to the negative electrode external terminal via a negative electrode current collector between the electrode body and the sealing plate. The positive electrode current collector includes a first positive electrode current collector and a second positive electrode current collector. The first positive electrode current collector and the second positive electrode current collector are welded to each other at a welding point covered with a first covering member. The negative electrode current collector includes a first negative electrode current collector and a second negative electrode current collector. The first negative electrode current collector and the second negative electrode current collector are welded to each other at a welding point covered with a second covering member.

The first positive electrode current collector has a first recess. The first positive electrode current collector and the second positive electrode current collector are stacked and welded at the first recess. The first covering member covers the first recess.

The first recess includes a first thinner part. The first positive electrode current collector is welded to the second positive electrode current collector by full penetration welding at the first thinner part.

The first covering member enters a dent formed by the first recess.

The first negative electrode current collector has a second recess. The first negative electrode current collector and the second negative electrode current collector are stacked and welded at the second recess. The second covering member covers the second recess.

The second recess includes a second thinner part. The first negative electrode current collector is welded to the second negative electrode current collector by full penetration welding at the second thinner part.

The second covering member enters a dent formed by the second recess.

Advantages of the Invention

In the battery of the present invention, the tab provided at at least one of the positive and negative electrode plates is electrically connected to the external terminal via the current collector between the electrode body and the sealing plate. The current collector includes the first and second current collectors. The first and second current collectors are welded to each other at the welding point covered with the covering member. This configuration effectively reduces the dust generated by the welding between the first and second current collectors and entering the inside of the electrode body.

DESCRIPTION OF EMBODIMENT

Figure 1:
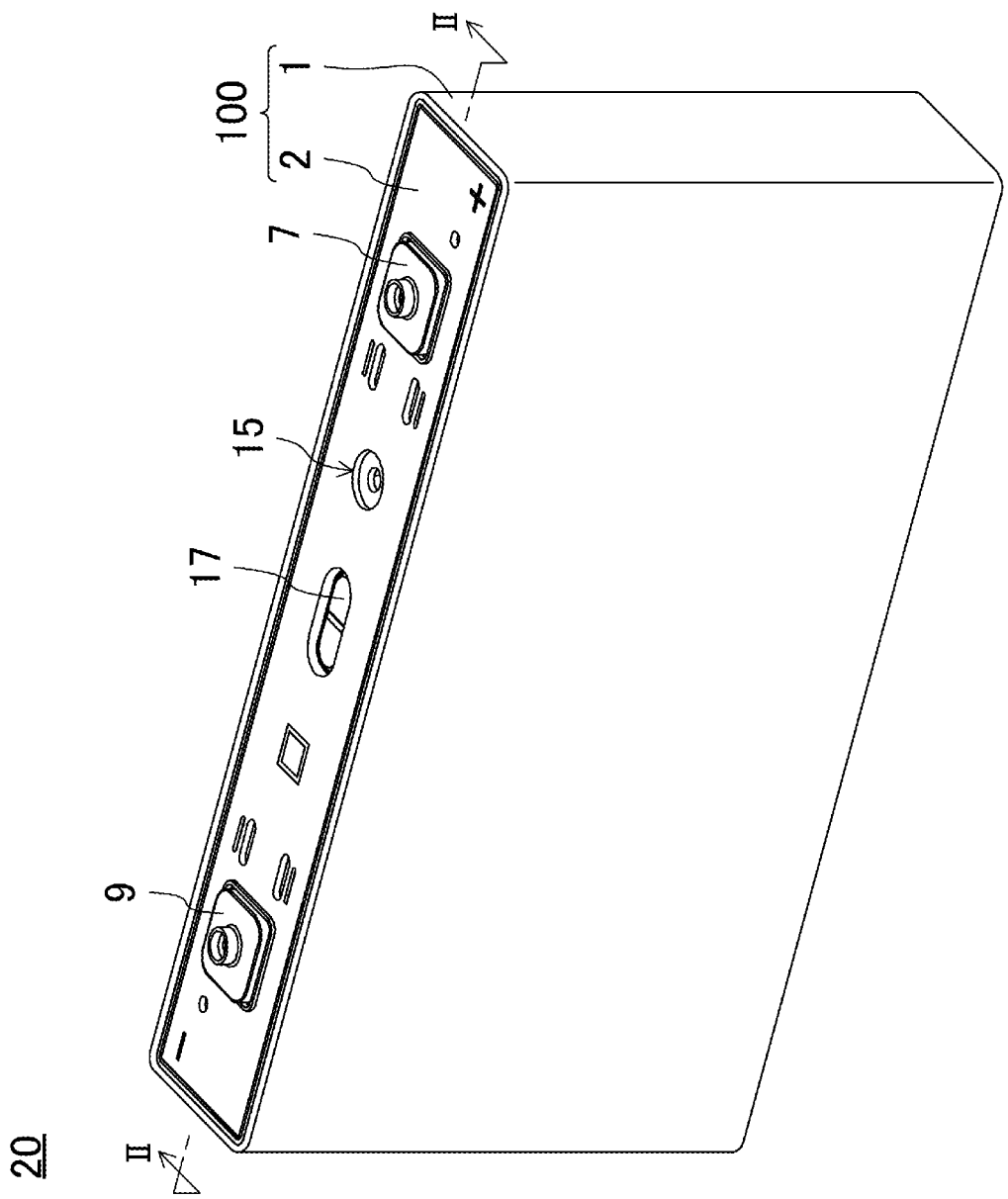
FIG. 1 is a perspective view of a secondary battery of an embodiment.

Hereinafter, an embodiment of the present invention will be described in detail with reference to the drawings. The following description of an advantageous embodiment is a mere example in nature, and is not at all intended to limit the scope, applications or use of the present invention. In the drawings below, constituent features substantially sharing the same function are denoted with the same reference sign for the sake of simplicity.

First Embodiment

A configuration of a rectangular secondary battery 20 as a secondary battery of a first embodiment will be described below. Note that the present invention is not limited to the following embodiment.

Figure 2:
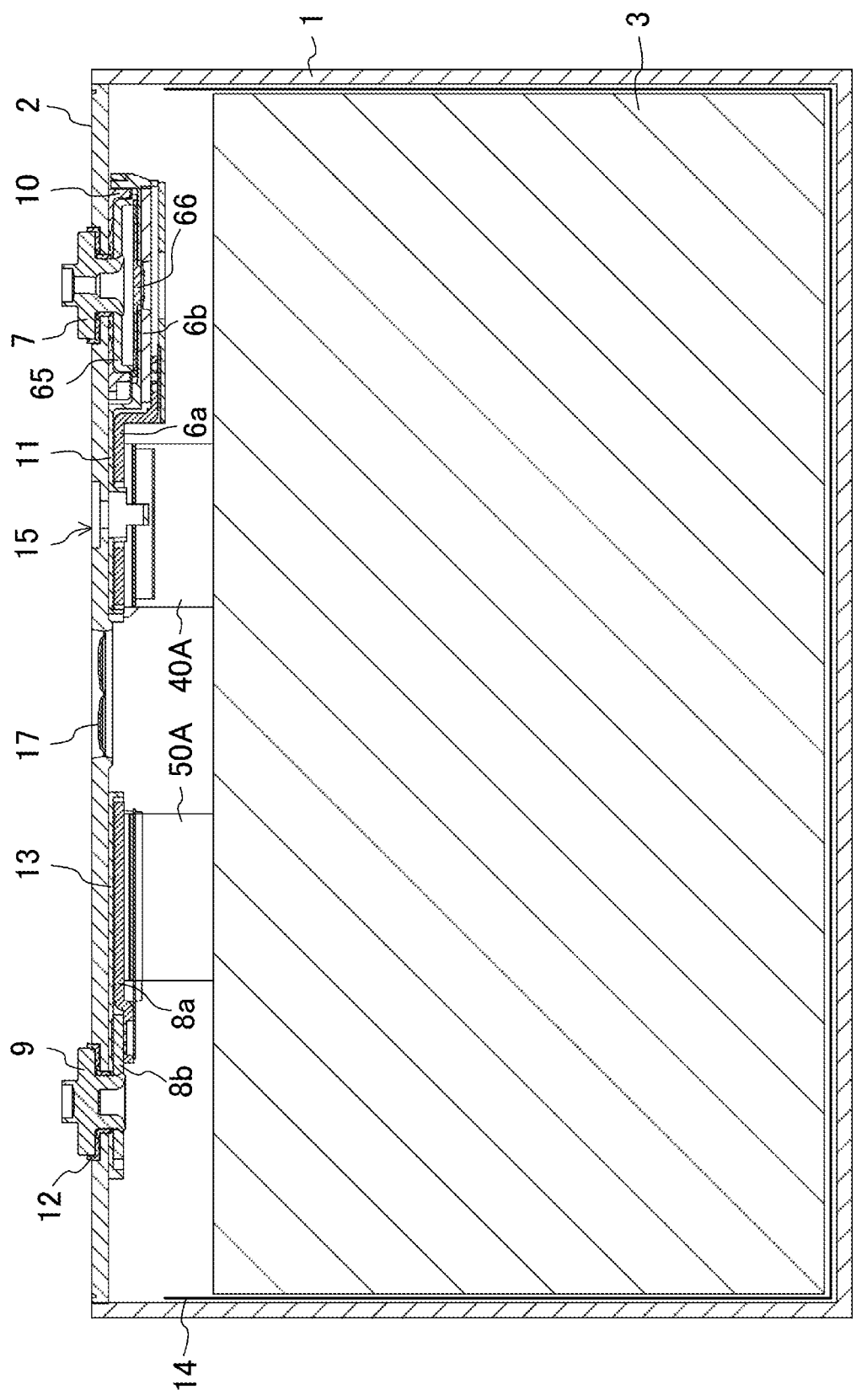
FIG. 2 is a cross-sectional view taken along line II-II in FIG. 1.

As shown in FIGS. 1 and 2, the rectangular secondary battery 20 includes a battery case 100 including a rectangular exterior body 1 and a sealing plate 2. The rectangular exterior body 1 is in the shape of a bottomed rectangular tube with an opening. The sealing plate 2 seals the opening of the rectangular exterior body 1. Each of the rectangular exterior body 1 and the sealing plate 2 is made of metal, particularly, aluminum or an aluminum alloy in one preferred embodiment. The rectangular exterior body 1 houses an electrode body 3 obtained by stacking a positive electrode plate and a negative electrode plate with a separator interposed therebetween, together with an electrolyte. As will be described later, in this embodiment, the electrode body 3 includes first and second electrode body elements which have the same configuration.

Figure 5:
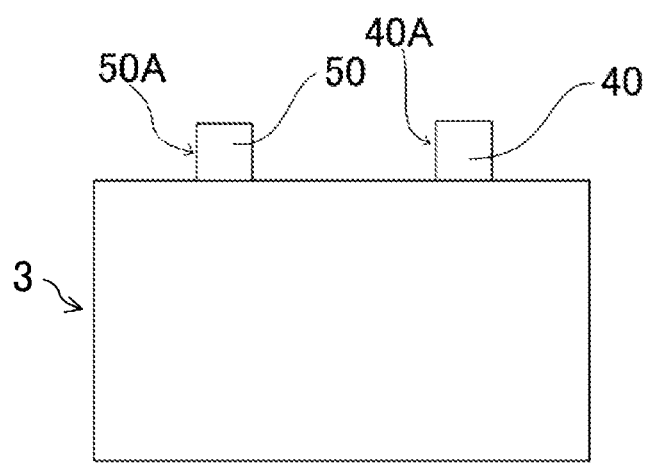
FIG. 5 is a plan view of an electrode body.

As shown in FIG. 5, the electrode body 3 includes, at the end at the sealing plate 2, a positive electrode tab group 40A of positive electrode tabs (or tabs) 40 and a negative electrode tab group 50A of negative electrode tabs (tabs) 50. The positive electrode tab group 40A is electrically connected to a positive electrode terminal 7 via a first positive electrode current collector (or positive electrode current collector) 6a and a second positive electrode current collector 6b. The negative electrode tab group 50A is electrically connected to a negative electrode terminal 9 via a first negative electrode current collector (or negative electrode current collector) 8a and a second negative electrode current collector 8b. The first and second positive electrode current collectors 6a and 6b and the first and second negative electrode current collectors 8a and 8b are attached to the side of the sealing plate 2 inside the battery, and connected to the positive and negative electrode tab groups 40A and 50A on the surface of the sealing plate 2 facing the inside of the battery.

The first and second positive electrode current collectors 6a and 6b and the positive electrode terminal 7 are made of metal, particularly, aluminum or an aluminum alloy in one preferred embodiment. Interposed between the positive electrode terminal 7 and the sealing plate 2 is an external insulation member 10 of a resin. Interposed between the first and second positive electrode current collectors 6a and 6b and the sealing plate 2 is an internal insulation member 11 of a resin.

The first and second negative electrode current collectors 8a and 8b and the negative electrode terminal 9 are made of metal, particularly, copper or a copper alloy in one preferred embodiment. The negative electrode terminal 9 has a part made of aluminum or an aluminum alloy, and a part made of copper or a copper alloy in one preferred embodiment. In this case, the part made of copper or a copper alloy is connected to the second negative electrode current collector 8b, and the part made of aluminum or an aluminum alloy projects outward beyond the sealing plate 2 in one preferred embodiment. Interposed between the negative electrode terminal 9 and the sealing plate 2 is an external insulation member 12 of a resin. Interposed between the first and second negative electrode current collectors 8a and 8b and the sealing plate 2 is an internal insulation member 13 of a resin.

Interposed between the electrode body 3 and the rectangular exterior body 1 is an electrode body holder 14 that is a resin sheet. A resin insulation sheet is folded and molded into a bag or a box as the electrode body holder 14 in one preferred embodiment. This electrode body holder 14 reliably keeps the electrode body 3 and the rectangular exterior body 1 electrically insulated from each other.

The sealing plate 2 has an electrolyte inlet 15 which is sealed by a sealing member (not shown) after injecting the electrolyte. The sealing plate 2 has a gas discharge valve 17 which is broken once the pressure inside the battery case 100 reaches a predetermined value or more to discharge the gas inside the battery case 100 outside the battery case 100.

Now, the details of a production method and components of the rectangular secondary battery 20 will be described.

[Positive Electrode Plate]

First, a method of producing a positive electrode plate will be described.

[Preparation of Slurry for Positive Electrode Active Material Mixture Layer]

A slurry for a positive electrode active material mixture layer is prepared by kneading a positive electrode active material, a conductive agent, and a binder, for example. Examples of the positive electrode active material include lithium composite oxides such as lithium nickel cobalt manganese composite oxides. In addition, examples of the binder include fluorine resins such as polyvinylidene fluoride (PVdF). Examples of the conductive agent include carbon materials such as carbon black.

[Preparation of Slurry for Positive Electrode Protective Layer]

Alumina powder, graphite as a conductive agent, polyvinylidene fluoride (PVdF) as a binder, N-methyl-2-pyrrolidone (NMP) as a dispersion medium are kneaded into a slurry for a positive electrode protective layer.

[Formation of Positive Electrode Active Material Mixture Layer and Positive Electrode Protective Layer] The slurries for the positive electrode active material mixture layer and the positive electrode protective layer prepared as described above are applied to both sides of an aluminum foil as a positive electrode core with a thickness of 15 µm by a die coater. The slurry for the positive electrode protective layer is applied to at least one transverse end of an area applied with the slurry of the positive electrode active material mixture layer.

Figure 3:
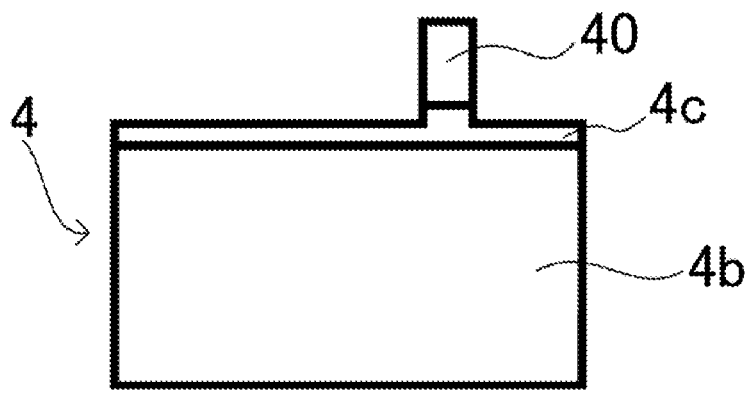
FIG. 3 is a plan view of a positive electrode plate.

The positive electrode core applied with the slurries for the positive electrode active material mixture layer and the positive electrode protective layer is dried to remove NMP inside the slurry. Accordingly, the positive electrode active material mixture layer and the protective layer are formed. After that, the positive electrode active material mixture layer passes between a pair of press rollers so as to be compressed into a positive electrode original plate. This positive electrode original plate is cut into a predetermined size as a positive electrode plate 4 shown in FIG. 3. The positive electrode plate 4 has a rectangular shape with an upper side from which the positive electrode tabs 40 project. The positive electrode plate 4 includes a narrow positive electrode protective layer 4c along the upper side, and a positive electrode active material mixture layer 4b from the bottom of the positive electrode protective layer 4c to the lower side of the positive electrode plate 4. As described above, the positive electrode tabs 40 may be formed from the positive electrode core, or another member may be connected to the positive electrode plate to serve as the positive electrode tabs.

[Negative Electrode Plate]

Next, a method of producing a negative electrode plate will be described.

[Preparation of Slurry for Negative Electrode Active Material Mixture Layer]

A slurry for a negative electrode active material mixture layer is prepared by kneading a negative electrode active material, a conductive agent, a binder, and a thickener, for example. Examples of the negative electrode active material include carbon materials such as graphite. Examples of the binder include styrene butadiene rubber (SBR). Examples of the thickener include carboxymethyl cellulose (CMC).

[Formation of Negative Electrode Active Material Mixture Layer]

The slurry for the negative electrode active material mixture layer prepared as described above is applied to both sides of a copper foil as a negative electrode core with a thickness of 8 µm by a die coater.

Figure 4:
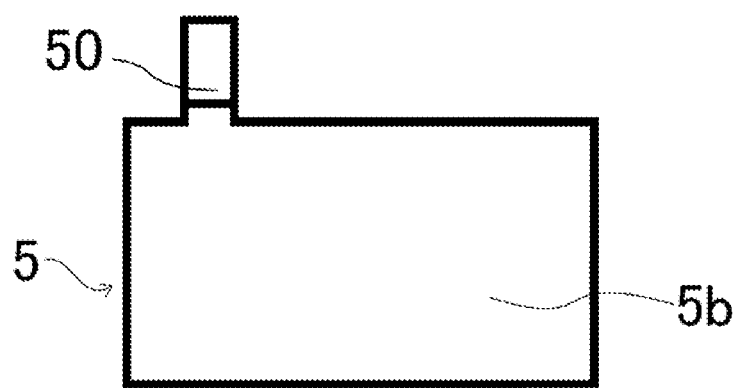
FIG. 4 is a plan view of a negative electrode plate.

The negative electrode core applied with the slurry for the negative electrode active material mixture layer is dried to remove water inside the slurry. Accordingly, the negative electrode active material mixture layer is formed. After that, the negative electrode active material mixture layer passes between a pair of press rollers so as to be compressed into a negative electrode original plate. This negative electrode original plate is cut into a predetermined size as a negative electrode plate 5 shown in FIG. 4. The negative electrode plate 4 has a rectangular shape with an upper side from which the negative electrode tabs 50 project. Accordingly, the negative electrode active material mixture layer 5b is formed on the entire surface of the negative electrode core except the negative electrode tabs 50. As described above, the negative electrode tabs 50 may be formed from the negative electrode core, or another member may be connected to the negative electrode plate to serve as the negative electrode tabs.

[Preparation of Electrode Body]

The positive and negative electrode plates 4 and 5 prepared as described above are stacked one on the other with a separator interposed therebetween to obtain the multilayer electrode body 3. The numbers of the positive and negative electrode plates 4 and 5 included in the electrode body 3 are not particularly limited but may be tens or more in one preferred embodiment. As shown in FIG. 5, the electrode body 3 includes, at one end, the positive electrode tab group 40A of the positive electrode tabs 40 and the negative electrode tab group 50A of the negative electrode tabs 50.

[Connection Between Current Collectors and Tabs]

Figure 6:
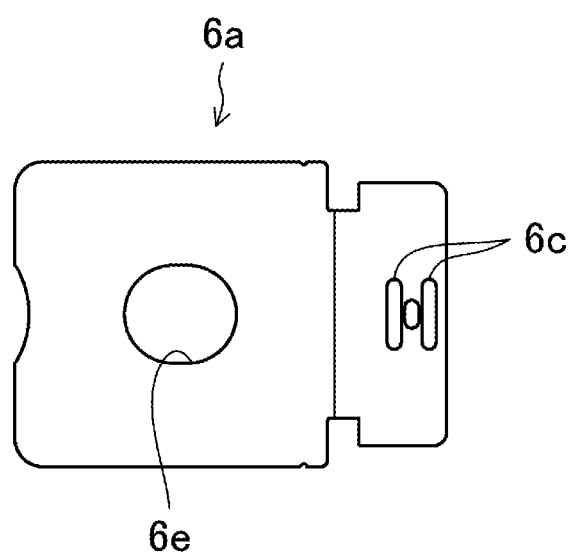
FIG. 6 is a plan view of a first positive electrode current collector (or positive electrode current collector).
Figure 7:
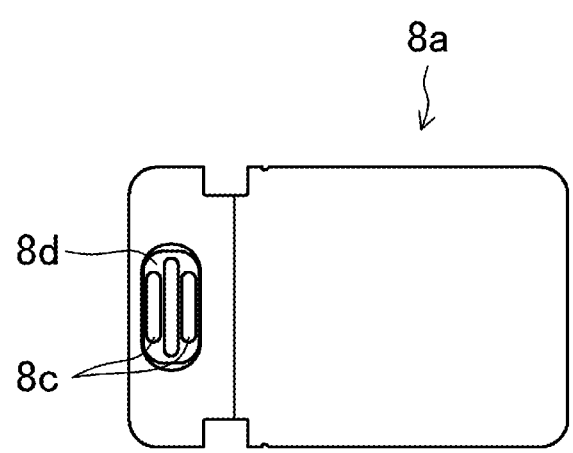
FIG. 7 is a plan view of a first negative electrode current collector (or negative electrode current collector).
Figure 8:
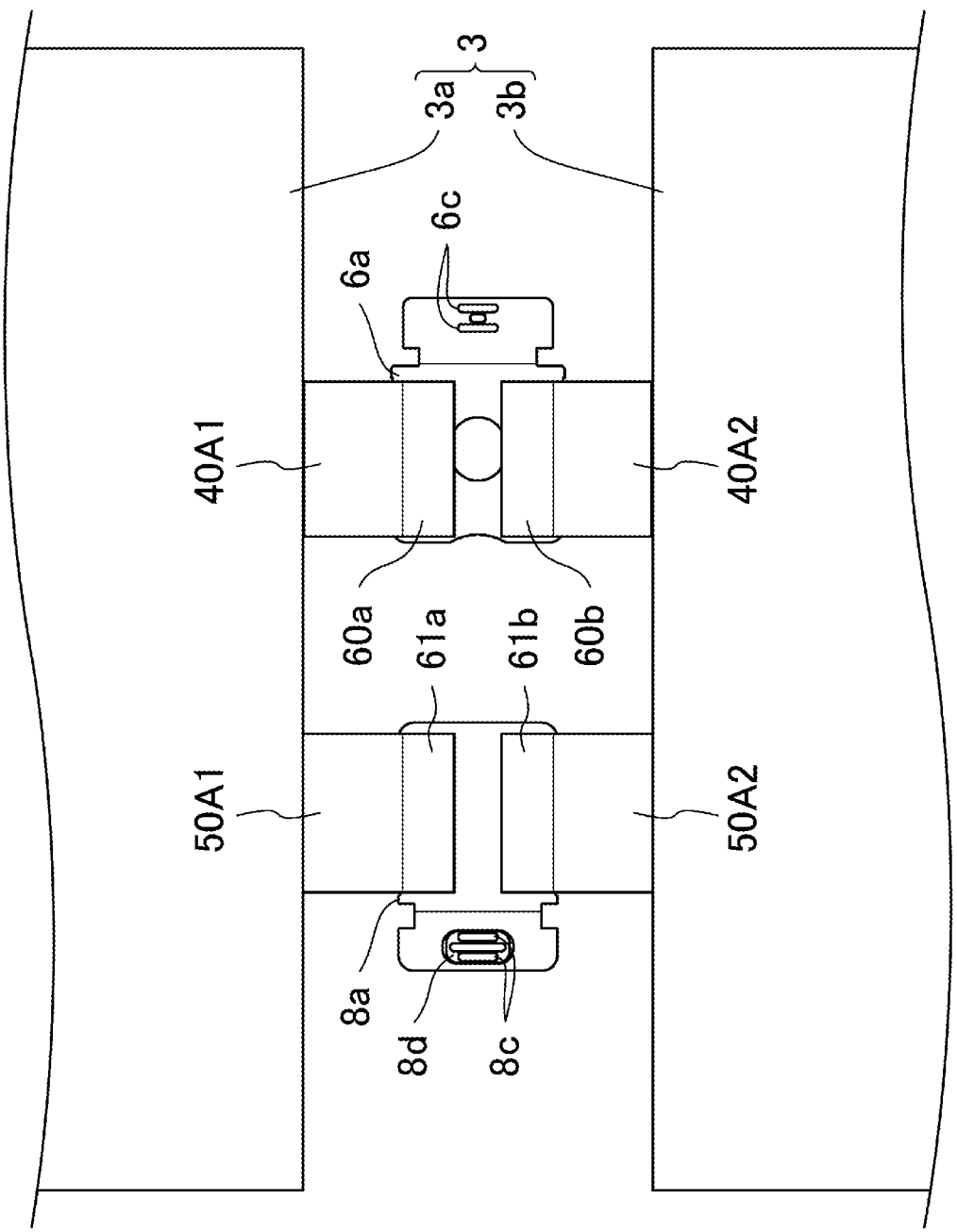
FIG. 8 shows that a positive electrode tab group is connected to the first positive electrode current collector, and a negative electrode tab group is connected to the first negative electrode current collector.

The positive electrode tab group 40A described above is connected to the first positive electrode current collector 6a shown in FIG. 6 by welding. The first positive electrode current collector 6a has a current collector through-hole 6e to face the electrolyte inlet 15 of the sealing plate 2. The negative electrode tab group 50A described above is connected to the first negative electrode current collector 8a shown in FIG. 7 by welding. FIG. 8 shows that the positive electrode tab group 40A is connected to the first positive electrode current collector 6a, and the negative electrode tab group 50A is connected to the first negative electrode current collector 8a.

In this embodiment, as shown in FIG. 8, the electrode body 3 includes first and second electrode body elements 3a and 3b. Note that the first and second electrode body elements 3a and 3b are prepared by the same method as the electrode body 3 described above.

A first positive electrode tab group 40A1 of the first electrode body element 3a and a second positive electrode tab group 40A2 of the second electrode body element 3b are connected to the first positive electrode current collector (or positive electrode current collector) 6a. A first negative electrode tab group 50A1 of the first electrode body element 3a and a second negative electrode tab group 50A2 of the second electrode body element 3b are connected to the first negative electrode current collector (or negative electrode current collector) 8a. The first and second positive electrode tab groups 40A1 and 40A2 are welded and connected to the first positive electrode current collector 6a to form welding joints 60a and 60b. The two welding joints 60a and 60b on the positive electrode side are spaced apart from each other in the direction perpendicular to the upper side of the electrode body 3, that is, in the direction perpendicular to the length of the sealing body 2. The current collector through-hole 6e is interposed between the two welding joints 60a and 60b of the positive electrode.

The first and second negative electrode tab groups 50A1 and 50A2 are welded and connected to the first negative electrode current collector 8a to form welding joints 61a and 61b. The two welding joints 61a and 61b on the negative electrode side are also spaced apart from each other in the direction perpendicular to the upper side of the electrode body 3, that is, in the direction perpendicular to the length of the sealing body 2.

The first positive electrode current collector 6a has a thinner part 6c. At this thinner part 6c, the first positive electrode current collector 6a is connected to the second positive electrode current collector 6b.

The first negative electrode current collector 8a has a recess 8d with a thinner part 8c. At this thinner part 8c, the first negative electrode current collector 8a is connected to the second negative electrode current collector 8b.

The welding connection between the positive electrode tab group 40A and the first positive electrode current collector 6a and between the negative electrode tab group 50A and the first negative electrode current collector 8a are made by ultrasonic welding, resistance welding, or laser welding, for example. In this embodiment, the welding connection is made by ultrasonic welding.

The connection between the first and second positive electrode current collectors 6a and 6b and between the first and second negative electrode current collectors 8a and 8b are made by ultrasonic welding, resistance welding, or laser welding, for example. In this embodiment, the welding connection is made by laser welding.

[Attachment of Components to Sealing Plate]

Figure 9:
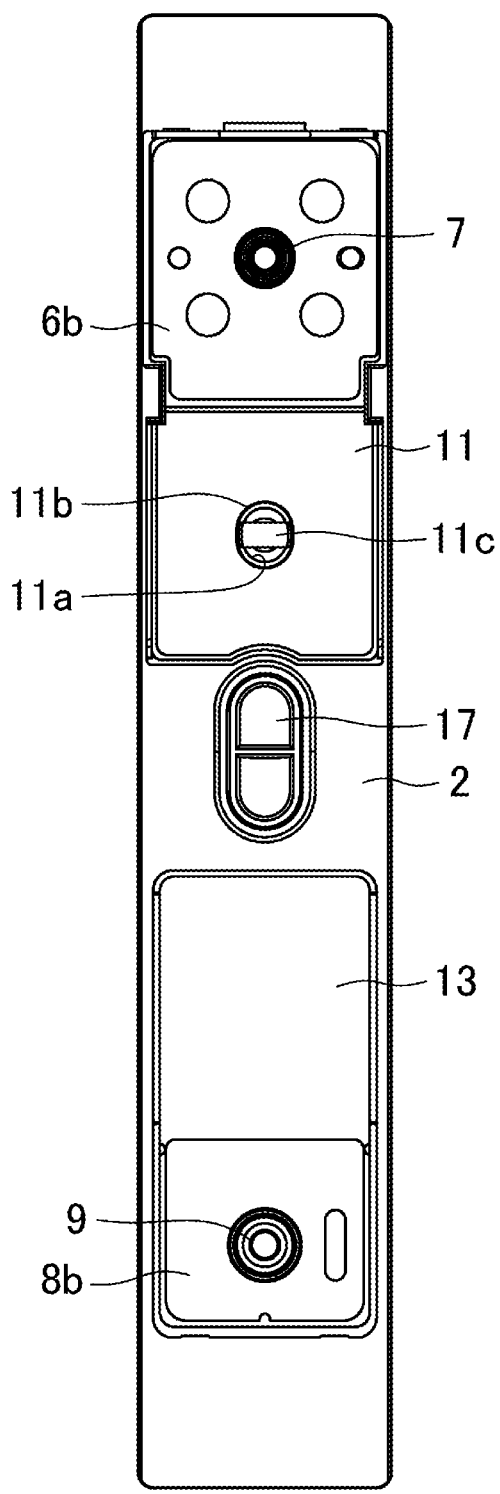
FIG. 9 shows the surface of a sealing plate facing the electrode body after attaching second positive and negative electrode current collectors.

FIG. 9 shows the surface of the sealing plate 2 facing the inside of the battery and attached with the components. The attachment of the components to the sealing plate 2 will be described with reference to FIGS. 2 and 9.

The external insulation member 10 surrounds a positive electrode terminal insertion hole of the sealing plate 2. The internal insulation member 11 and a cup-shaped conductive member 65 are arranged on the inner surface of the battery around the positive electrode terminal insertion hole of the sealing plate 2. The positive electrode terminal 7 is then inserted from the outside of the battery through the through-hole of the external insulation member 10, the positive electrode terminal insertion hole of the sealing plate 2, the through-hole of the internal insulation member 11, and a terminal connection hole of the conductive member 65. The tip of the positive electrode terminal 7 is crimped onto the conductive member 65. As a result, the positive electrode terminal 7 and the conductive member 65 are fixed to the sealing plate 2. The crimped part of the positive electrode terminal 7 and the conductive member 65 are welded and connected in one preferred embodiment.

The conductive member 65 has an opening inside the battery. A disk-shaped deformable plate 66 closes the opening of the conductive member 65, and has a peripheral edge welded and connected to the conductive member 65. Accordingly, the opening is sealed. Each of the conductive member 65 and the deformable plate 66 is made of metal, particularly, aluminum or an aluminum alloy in one preferred embodiment. The second positive electrode current collector 6b is then placed on the side of the deformable plate 66 closer to the inside of the battery. The two are welded and connected.

Next, the external insulation member 12 is placed on the outer surface of the battery around a negative electrode terminal insertion hole of the sealing plate 2. Next, the internal insulation member 13 and the second negative electrode current collector 8b are arranged on the inner surface of the battery around the negative electrode terminal insertion hole of the sealing plate 2. The negative electrode terminal 9 is then inserted from the outside of the battery through the through-hole of the external insulation member 12, the negative electrode terminal insertion hole of the sealing plate 2, the through-hole of the internal insulation member 13, and the terminal connection hole of the second negative electrode current collector 8b. The tip of the negative electrode terminal 9 is crimped onto the second negative electrode current collector 8b. As a result, the negative electrode terminal 9 and the second negative electrode current collector 8b are fixed to the sealing plate 2. The crimped part of the negative electrode terminal 9 and the second negative electrode current collector 8b are welded and connected in one preferred embodiment.

The internal insulation member 11 on the positive electrode side has a liquid injection opening 11a to face the electrolyte inlet 15 of the sealing plate 2. The internal insulation member 11 has, at the edge of the liquid injection opening 11a, a tube 11b projecting in a cylindrical shape toward the inside of the battery. The internal insulation member 11 further includes an opening cover 11c projecting from two points on the edge of the tube 11b toward the inside of the battery to connect the two points like a bridge. The tube 11b and the opening cover 11c are inserted into the current collector through-hole 6e of the first positive electrode current collector 6a.

[Connection Between First and Second Current Collectors]

Figure 10:
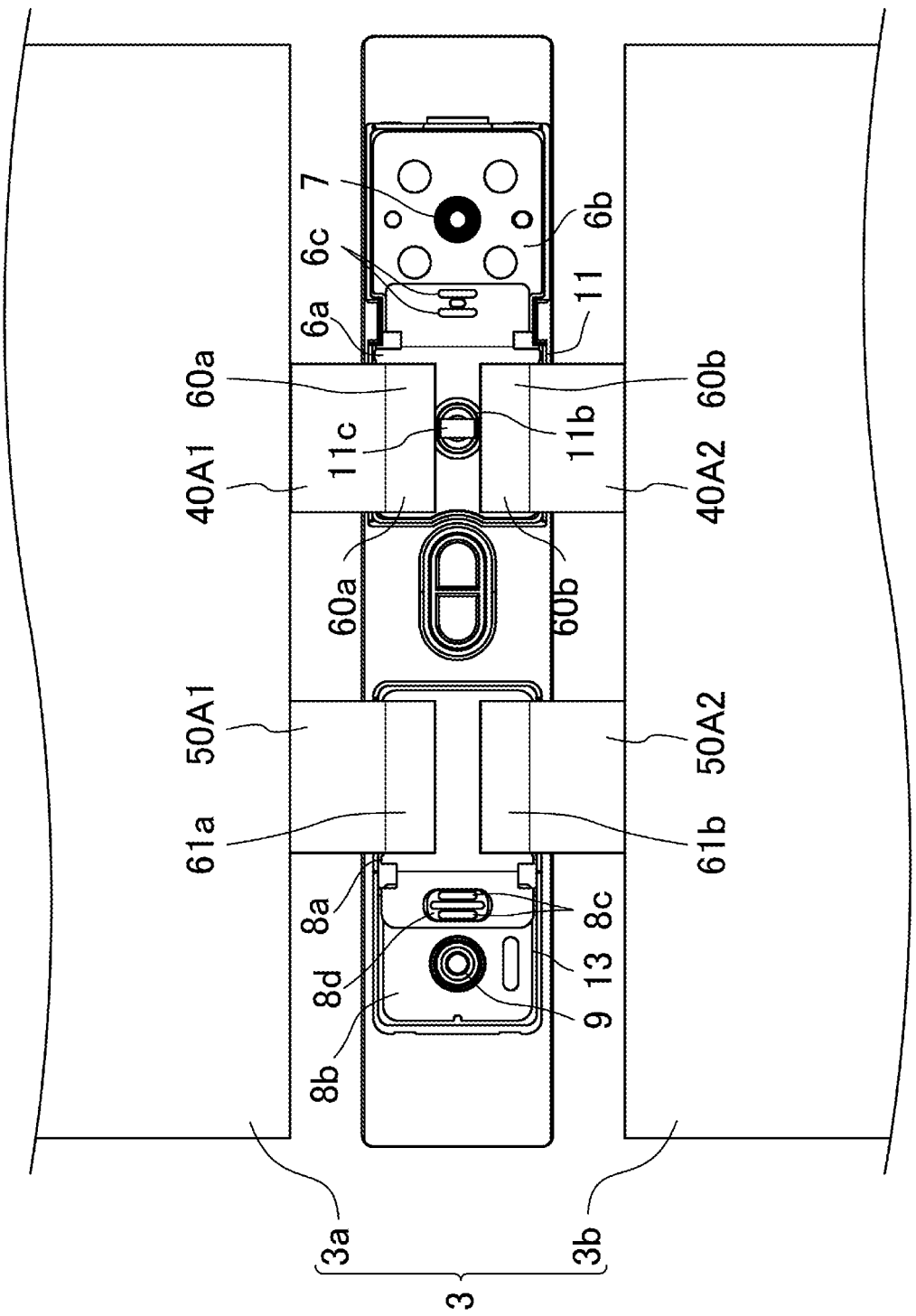
FIG. 10 shows the surface of the sealing plate facing the electrode body after attaching the first positive electrode current collector to the second positive electrode current collector, and the first negative electrode current collector to the second negative electrode current collector.

FIG. 10 shows the surface of the sealing plate 2 facing the inside of the electrode body after attaching the first positive electrode current collector 6a to the second positive electrode current collector 6b, and the first negative electrode current collector 8a to the second negative electrode current collector 8b.

The first positive electrode current collector 6a connected to the first and second positive electrode tab groups 40A1 and 40A2 is placed on the internal insulation member 11 so as to partially overlap the second positive electrode current collector 6b. By irradiating the thinner part 6c with a laser, the first and second positive electrode current collectors 6a and 6b are welded and connected to form a positive electrode current collector welding joint. The first negative electrode current collector 8a connected to the first and second negative electrode tab groups 50A1 and 50A2 is placed on the internal insulation member 13 so as to partially overlap the second negative electrode current collector 8b. By irradiating the thinner part 8c with a laser, the first and second negative electrode current collectors 8a and 8b are welded and connected to form a negative electrode current collector welding joint. The joint between the first and second negative electrode current collectors 8a and 8b will be described later in detail.

[Covering Joints]

Figure 11:
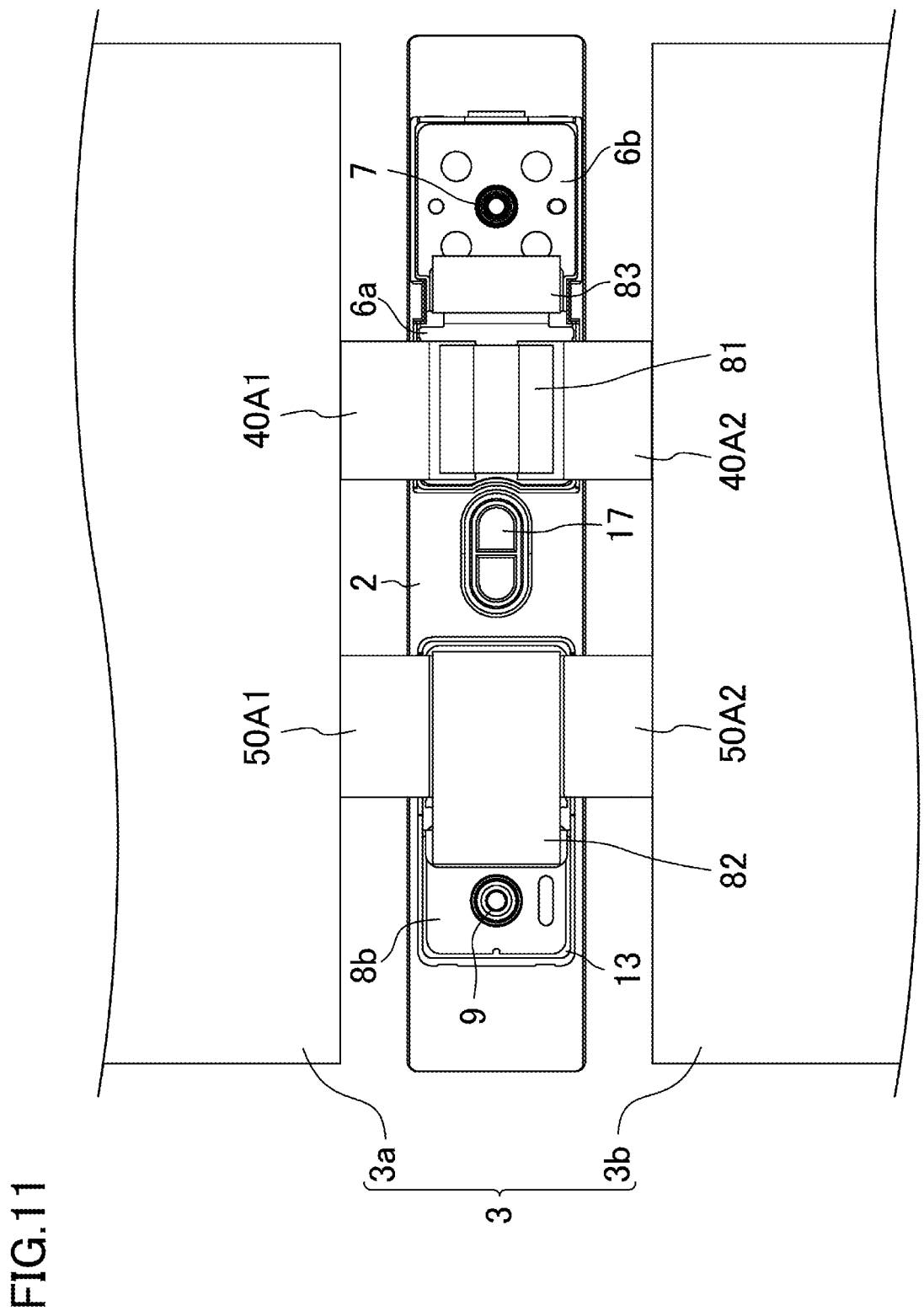
FIG. 11 corresponds to FIG. 10 with a covering member attached.

As shown in FIG. 11, the welding joint 60a between the first positive electrode current collector 6a and the first positive electrode tab group 40A1, and the welding joint 60b between the first positive electrode current collector 6a and the second positive electrode tab group 40A2 are covered with a first covering member 81. Accordingly, the first covering member 81 catches the foreign objects existing at the welding joints 60a and 60b, particularly the metal powder generated in a welding process not to cause the foreign objects to enter the inside of the electrode body 3. This largely reduces the internal short circuits caused by the foreign objects. The first covering member 81 is bonded to the welding joints 60a and 60b. In the area between the two welding joints 60a and 60b, the first covering member 81 is spaced apart from and covers the area.

Next, the welding joint 61a between the first negative electrode current collector 8a and the first negative electrode tab group 50A1, and the welding joint 61b between the first negative electrode current collector 8a and the second negative electrode tab group 50A2 are covered with a second covering member 82. The second covering member 82 also covers the surface of the first negative electrode current collector 8a between the two welding joints 61a and 61b. Accordingly, the second covering member 82 catches the foreign objects existing at the welding joints 61a and 61b, particularly the metal powder generated in a welding process not to cause the foreign objects to enter the inside of the electrode body 3. This largely reduces the internal short circuits caused by the foreign objects. The second covering member 82 is attached to the covered part.

The second covering member 82 further covers the joint (i.e., the negative electrode current collector welding joint) between the first and second negative electrode current collectors 8a and 8b. That is, a part of the second negative electrode current collector 8b is covered with the second covering member 82. Accordingly, the second covering member 82 catches the foreign objects (e.g., metal powder) generated by welding the first and second negative electrode current collectors 8a and 8b not to cause the foreign objects to enter the inside of the electrode body 3.

Figure 12:
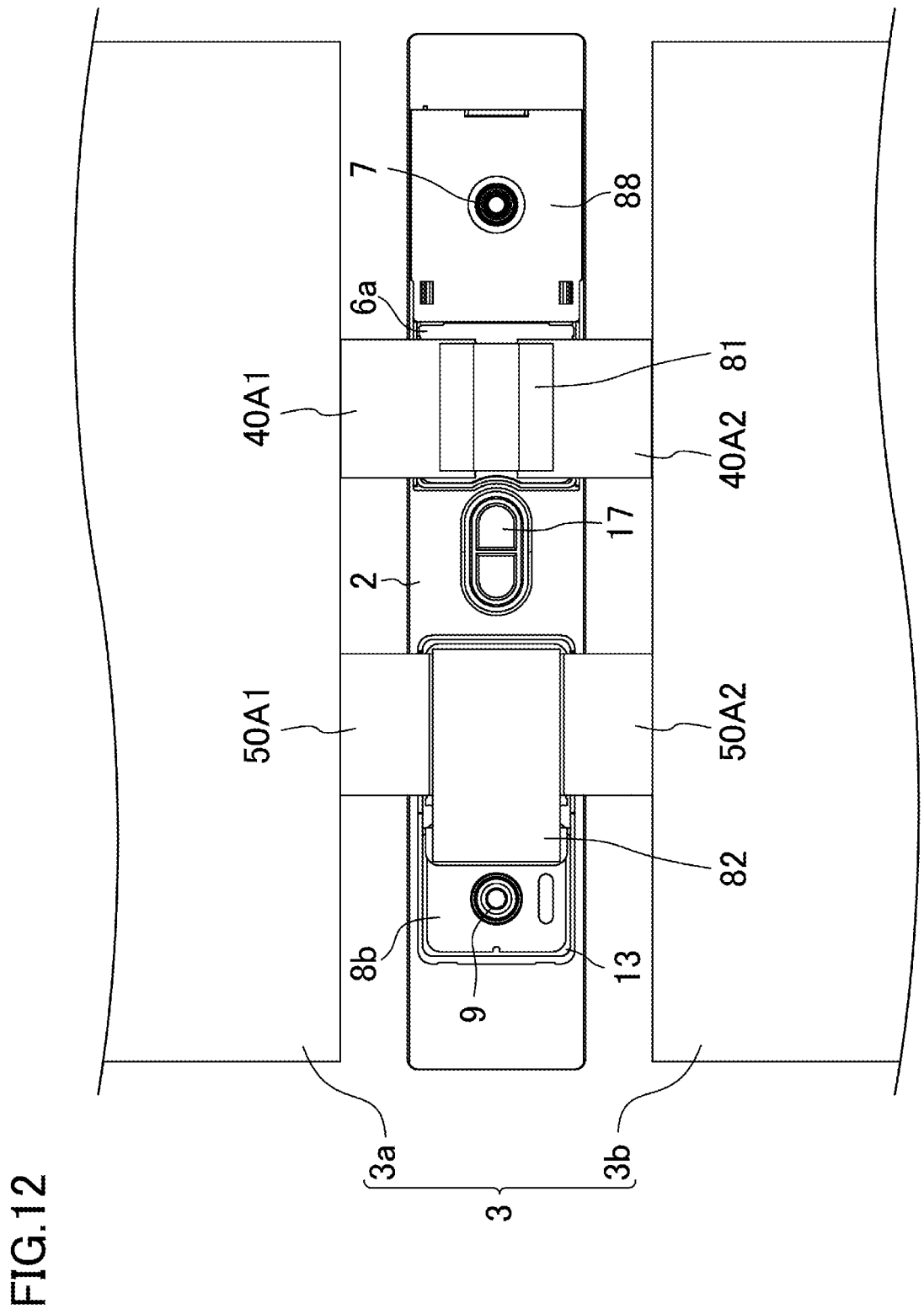
FIG. 12 corresponds to FIG. 11 with a cover member attached.

A third covering member 83 is then placed and bonded to cover the joint (i.e., the positive electrode current collector welding joint) between the first and second positive electrode current collectors 6a and 6b. Accordingly, the third covering member 83 catches the foreign objects existing at the positive electrode current collector welding joint, particularly the metal powder generated in the welding process between the first and second positive electrode current collectors 6a and 6b not to cause the foreign objects to enter the inside of the electrode body 3. As shown in FIG. 12, the second positive electrode current collector 6b and the third covering member 83 are then covered with a cover member 88.

In this embodiment, the first to third covering members 81, 82, and 83 are adhesive sheets obtained by applying an adhesive to a plastic film. The plastic film is not particularly limited, but a polypropylene film is selected in one preferred embodiment. The first to third covering members 81, 82, and 83 are not limited to the adhesive sheets.

[Preparation of Secondary Battery]

Next, the two positive electrode tab groups 40A1 and 40A2 and the two negative electrode tab groups 50A1 and 50A2 are curved so that the upper surfaces of the first and second electrode body elements 3a and 3b in FIG. 12 are in direct contact or indirect contact with each other with other members interposed therebetween. Accordingly, the two electrode body elements 3a and 3b are integrated into one electrode body 3. The integrated electrode body 3 is placed in the electrode body holder 14 obtained by molding an insulating sheet into a box or a bag.

The electrode body 3 wrapped with the electrode body holder 14 is inserted into the rectangular exterior body 1. The sealing plate 2 and the rectangular exterior body 1 are welded to seal the opening of the rectangular exterior body 1 with the sealing plate 2. The electrolyte is then injected into the rectangular exterior body 1 through the electrolyte inlet 15 of the sealing plate 2. After that, the electrolyte inlet 15 is sealed with a sealing member such as a blind rivet. As a result, the rectangular secondary battery 20 is complete.

<Joint Between First and Second Negative Electrode Current Collectors>

Figure 13:
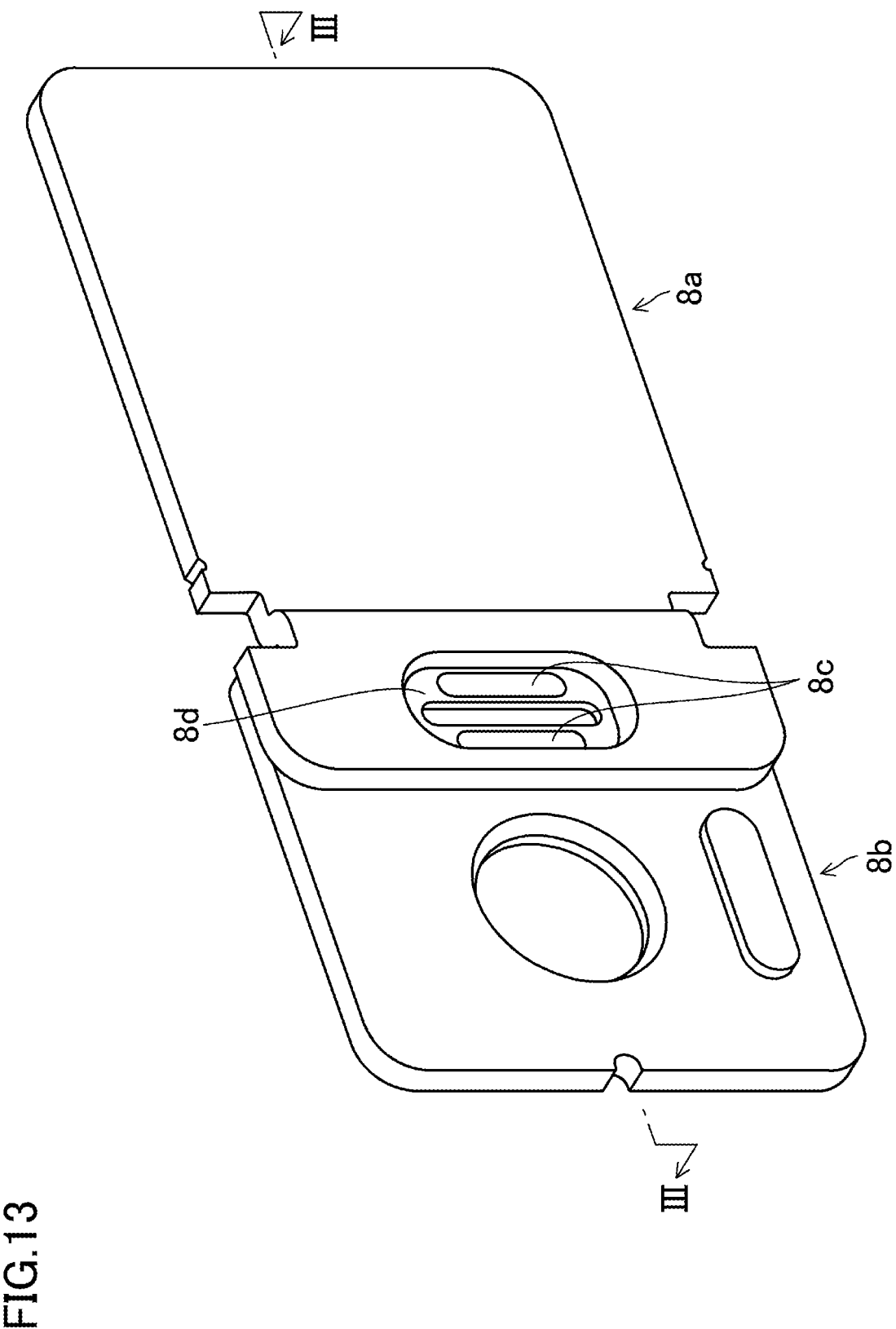
FIG. 13 is an enlarged perspective view of the first and second negative electrode current collectors stacked one on the other.
Figure 14:
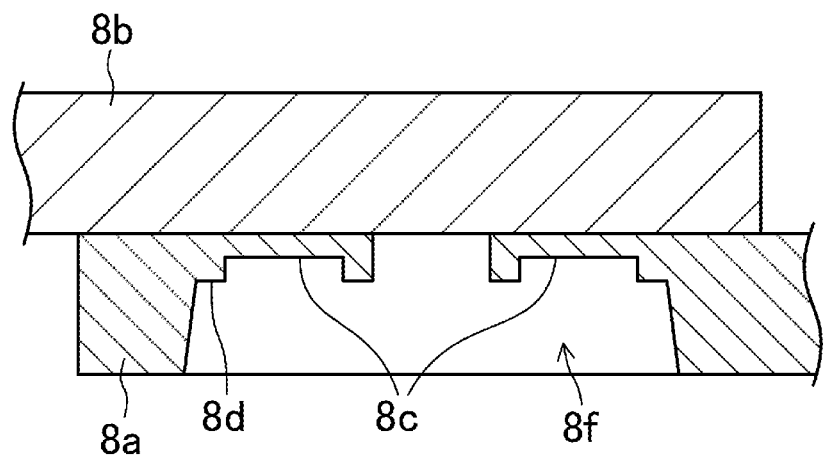
FIG. 14 is an enlarged cross-sectional view taken along line in FIG. 13.

The joint between the first and second negative electrode current collectors 8a and 8b will be further described. FIG. 13 shows that only the first and second negative electrode current collectors 8a and 8b are taken out and stacked for connection. FIG. 14 shows an enlarged cross-section of the joint. The first negative electrode current collector 8a has the recess 8d on a surface which is opposite to the surface overlapping the second negative electrode current collector 8b. The recess 8d has two thinner parts 8c. The first negative electrode current collector 8a has a dent 8f formed by the recess 8d.

Figure 15:
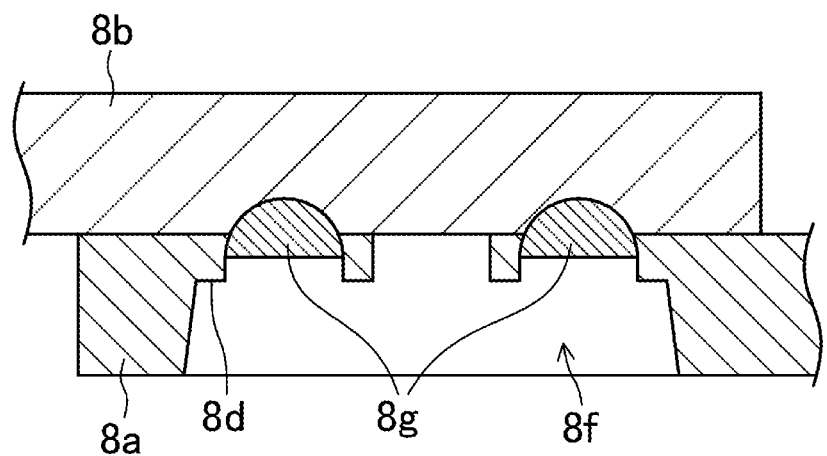
FIG. 15 is a schematic enlarged cross-sectional view of the welding connection between the first and second negative electrode current collectors.

In the state described above, the thinner parts 8c are irradiated with a laser to connect the first and second negative electrode current collectors 8a and 8b by full penetration welding as shown in FIG. 15. The laser welding is performed at the thinner parts 8c, which facilitates the formation of a full penetration welding point 8g.

Figure 16:
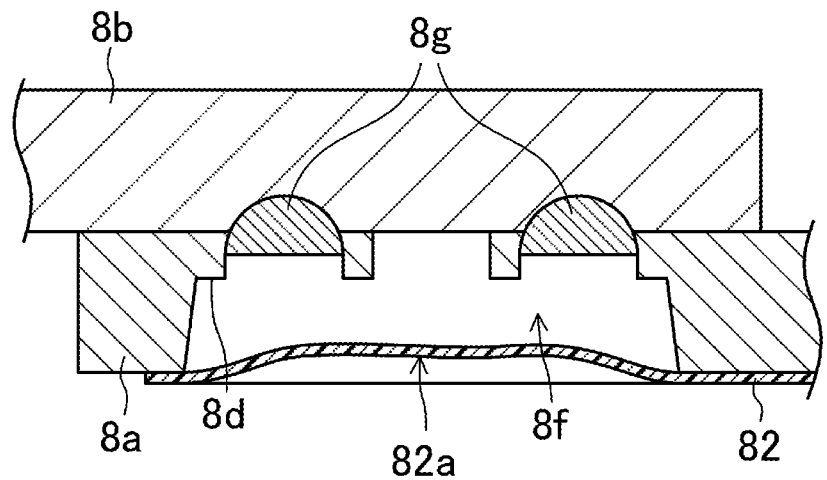
FIG. 16 is a schematic enlarged cross-sectional view corresponding to FIG. 15 with a covering member bonded.

Next, the second covering member 82 is bonded to the first and second negative electrode current collector 8a and 8b to cover the joint between the first and second negative electrode current collectors 8a and 8b. As shown in FIG. 16, the second covering member 82 closes the entire recess 8d (i.e., the dent 8f) and further enters the dent 8f. That is, a part 82a covering the dent 8f of the second covering member 82 has a shape recessed along the dent 8f.

The second covering member 82 has the recess 8c which is used to facilitate the alignment in the laser welding.

Other Embodiments

The above embodiment is an example of the present invention. The present invention is not limited to the example. The present invention may be a combination of a well-known art, a background technique, and a publicly-known technique with the example, and may also have a part of the example replaced. Moreover, the present invention includes modifications at which those skilled in the art easily arrive.

The electrode body may be wound after stacking the positive electrode plate, the negative electrode plate, and the separator. The electrode body element may also have a wound structure.

An example has been described above in the embodiment where the two electrode body elements are arranged in the exterior body, but the number of the electrode body elements may be one, three, or more.

An example has been described above in the embodiment where each of the positive and negative electrode current collectors includes two parts, but each of the positive electrode and negative electrode current collectors may include a single component.

The positive electrode plate, the negative electrode plate, the separator, the electrolyte, and other components may be made of known materials.

Each covering member may be made of any material as long as catching foreign objects, and is not limited to the adhesive sheet made of a plastic film. For example, the covering member may be made of a coating material such as a sealing resin that is cured by heat or light, or an adhesive sheet made of a metal foil, and a non-woven fabric, or other materials.

DESCRIPTION OF REFERENCE CHARACTERS

1 Rectangular Exterior Body (Exterior Body)
2 Sealing Plate
3 Electrode Body
3a First Electrode Body Element
3b Second Electrode Body Element
4 Positive Electrode Plate
5 Negative Electrode Plate
6a First Positive Electrode Current Collector
6b Second Positive Electrode Current Collector
6e Current Collector Through-Hole (Liquid Inlet)
7 Positive Electrode Terminal (Positive Electrode External Terminal)
8a First Negative Electrode Current Collector
8b Second Negative Electrode Current Collector
8c Thinner Part
8d Recess
8f Dent
8g Full Penetration Welding Point
9 Negative Electrode Terminal (Negative Electrode External Terminal)
11b Tube
11c Opening Cover
15 Electrolyte Inlet
20 Rectangular Secondary Battery (Battery)
20 Positive Electrode Tab (Tab)
40A Positive Electrode Tab Group
40A1 First Positive Electrode Tab Group
40A2 Second Positive Electrode Tab Group
50 Negative Electrode Tab (Tab)
50A Negative Electrode Tab Group
50A1 First Negative Electrode Tab Group
50A2 Second Negative Electrode Tab Group
60a, 60b Welding Joint (First Welding Point)
61a, 61b Welding Joint (Second Welding Point)
81 First Covering Member
82 Second Covering Member

The invention claimed is:

1. A battery comprising:
an electrode body obtained by stacking a positive electrode plate and a negative electrode plate with a separator interposed therebetween;
an exterior body having an opening and housing the electrode body;
a sealing plate sealing the opening;
an external terminal attached to the sealing plate; and
a tab provided at at least one of the positive electrode plate or the negative electrode plate and being electrically connected to the external terminal via a current collector between the electrode body and the sealing plate, wherein:
the current collector includes a first current collector and a second current collector,
the first current collector and the second current collector are welded to each other at a welding point,
the welding point is covered with a covering member,
the covering member is spaced apart from the welding point and the second collector,
the first current collector has a recess,
the first current collector and the second current collector are stacked and welded at the recess,
the covering member covers the recess, and
a part of the covering member enters a dent formed by the recess.

2. The battery of claim 1, wherein
the recess includes a thinner part having a thickness smaller than a thickness of a portion of the recess other than the thinner part, and
the first current collector is welded to the second current collector by full penetration welding at the thinner part.

* * * * *